United States Patent [19]

Atkinson

[11] 4,320,259

[45] Mar. 16, 1982

[54] ELECTRONIC SELECTOR FOR TELECOMMUNICATIONS SWITCHING

[75] Inventor: Roger F. Atkinson, Huntsville, Ala.

[73] Assignee: Itec, Inc., Huntsville, Ala.

[21] Appl. No.: 174,137

[22] Filed: Jul. 31, 1980

[51] Int. Cl.³ .................... H04Q 3/28; H04Q 5/22
[52] U.S. Cl. ............................................. 179/18 FG
[58] Field of Search ........ 179/18 FG, 18 FF, 18 FD, 179/18 G, 18 GA, 18 GD, 18 GE, 18 GF, 18 AB, 18 AF, 18 AG, 16 C, 16 D, 16 G

[56] References Cited

U.S. PATENT DOCUMENTS

| | | | |
|---|---|---|---|
| 3,542,959 | 11/1970 | Oseki et al. | 179/18 AF |
| 4,088,841 | 5/1978 | Weisigk et al. | 179/18 FG |
| 4,215,246 | 7/1980 | Sawyer | 179/18 FG |

*Primary Examiner*—Thomas A. Robinson

[57] ABSTRACT

An improved telephone system selector unit employing an electronic control arrangement is capable of directly replacing or being added on to existing electromechanical switching arrangements of the Strowger or other types which position themselves directly in response to subscriber dial pulses. The electronic circuitry establishes rapid outlet scanning via a matrix of twelve-pole relays, each of which permits selection of three four-wire lines or four three-wire lines, depending upon a pre-selected operating mode. A digit treatment circuit evaluates the counter digits, selects the appropriate outlet group, and precludes scanning of restricted lines or numbers not present in the numbering plan. During scanning each three or four-wire circuit of each relay is scanned in turn until an available circuit is found. The digit treatment arrangement permits additional outlet groups to be added without regard to the numbering sequence. All of the pulses of a digit are counted before any switching takes place in the selector.

17 Claims, 7 Drawing Figures

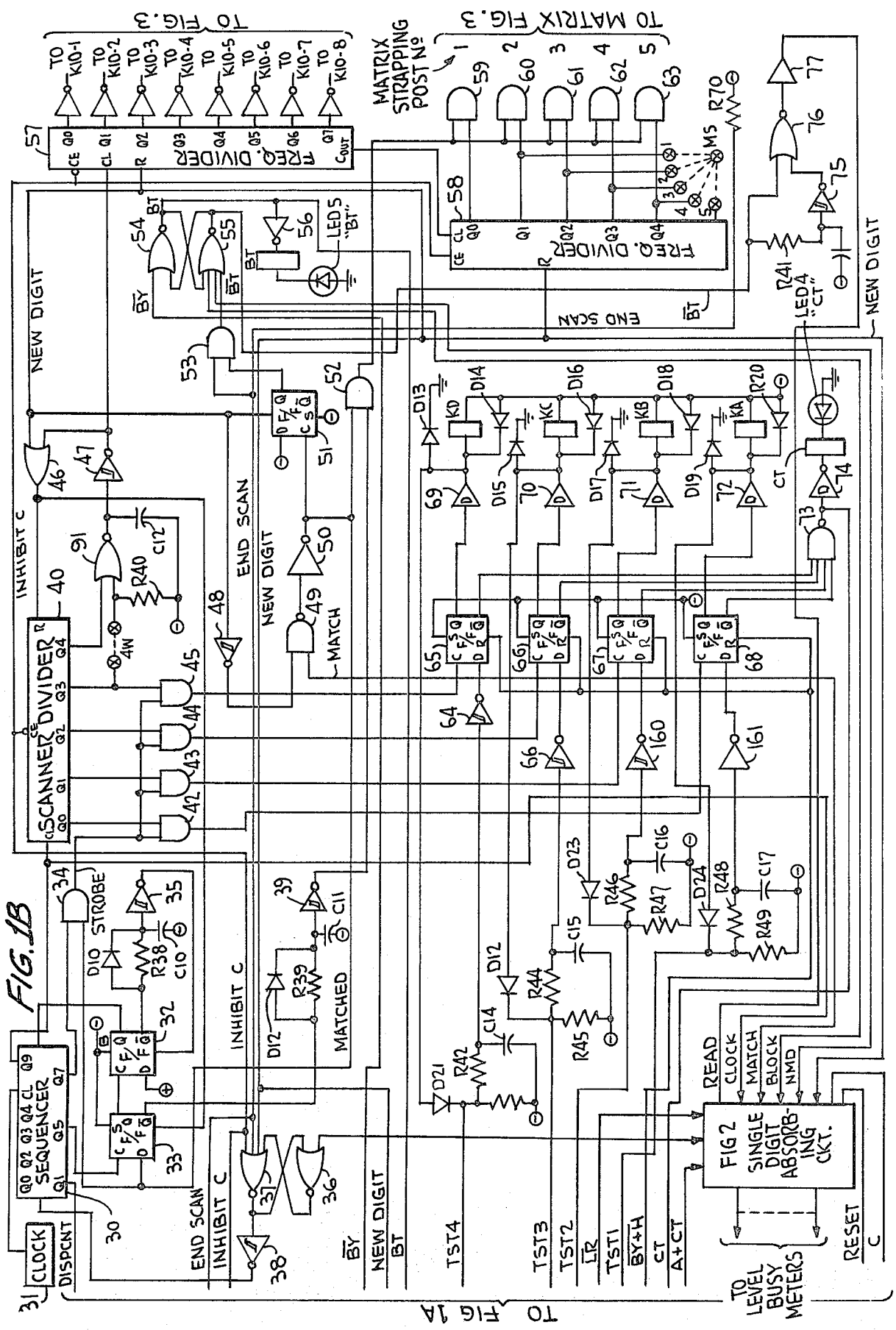

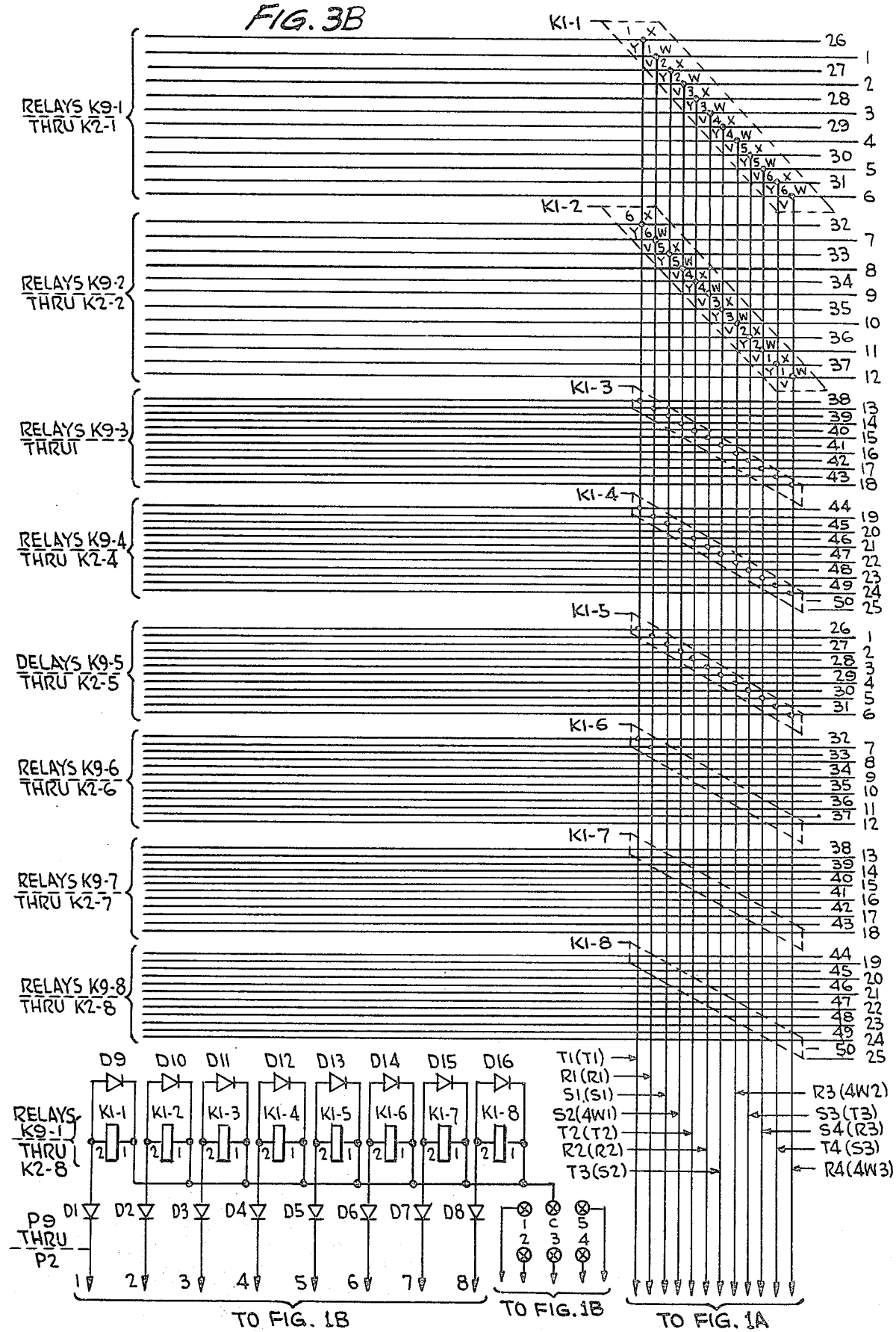

4,320,259

ELECTRONIC SELECTOR FOR TELECOMMUNICATIONS SWITCHING

TECHNICAL FIELD

The present invention relates to telephone switching systems and, more particularly, to selector units which can replace or be added on to existing systems.

BACKGROUND OF THE INVENTION

Electronic switching systems are well known in the prior art. However, in spite of the many advantages of electronic systems over the widely used electro-mechanical systems, electro-mechanical systems comprise approximately 90% of all of the telephone switching systems used in the world. The reason for this is that it is more economical for telephone companies to extend existing installations rather than replace such installations with completely new electronic units. Moreover, in the vast majority of telephone switching installations, the electro-mechanical switching units are functioning satisfactorily and are not fully depreciated.

It is an object of the present invention to provide a telephone selector switching unit which utilizes electronic control circuits and which is sufficiently compatible with existing step-by-step electro-mechanical switching arrangements so as to be capable of replacing such arrangements or be added on to extend system capability.

It is a further object of the present invention that such electronically controlled selector unit be capable of being part of a totally new switching system.

Most telephone systems in common use employ three or four wire systems. As a general rule, selector units for the switching arrangement must be designed for either three wire or four wire use and only considerable modification renders a selector designed for one system adaptable for the other.

It is another object of the present invention to provide a selector unit which is adaptable by a simple strapping of terminals to operate efficiently in either a three wire or four wire mode.

Progressive or step-by-step switching in telephone systems utilizes a series of selectors in which gross motion switches respond to each dial pulse by moving in an appropriate direction. Each selector makes a one out of ten selection with access after each selection to ten links in the next stage. This progressive switching approach is distinguished from the common control switching approach wherein a common control circuit determines whether a called line is busy before establishing a connection and determines a switching path according to traffic requirements rather than being dependent upon directory numbers.

It is an object of the present invention to utilize common control techniques within a progressive selector unit.

SUMMARY OF THE INVENTION

In accordance with the present invention an electronic control arrangement as utilized in a selector unit which is suitable for replacement of progressive step-by-step electro-mechanical selector units. The selector unit employs a matrix of twelve-pole relays whereby each relay is capable of switching three-four wire circuits or four-three wire circuits. Electronic control circuitry counts dial pulses before switching the matrix to the succeeding positions rather than moving from position to position in response to each dial pulse. A digit treatment circuit is employed to conserve circuitry by terminating calls for numbers which are either restricted or not present in the numbering plan. The digit treatment circuitry permits other outlet groups to be added on non-sequentially at a later date.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein:

FIG. 1B is a schematic diagram of another portion of the electronic control circuitry of the selector unit of the present invention;

FIGS. 3A and 3B constitute a schematic diagram of the matrix of twelve-pole relays utilized in conjunction with the selector of the present invention;

DESCRIPTION OF THE PREFERRED EMBODIMENTS

GENERAL DESCRIPTION

Figure 1A:
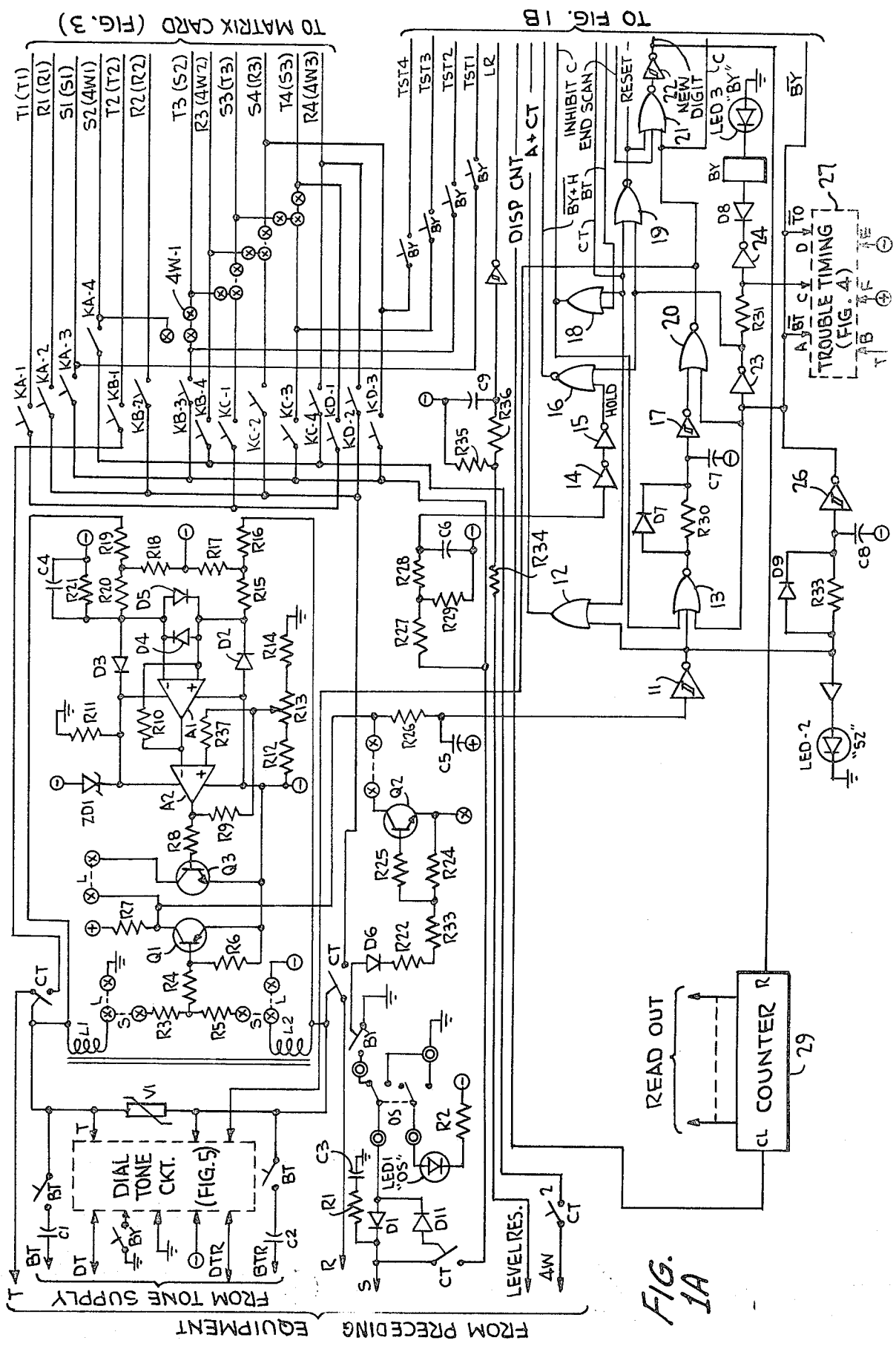
FIG. 1A is a schematic diagram of one portion of the electronic control circuitry of the selector of the present invention.

The selector unit described herein may be utilized in telephone switching applications as a local first, local or toll intermediate selector in existing step-by-step and XY systems or in totally new complete switching systems. The selector may be added on to other selector units to expand system capacity or may replace existing units, usually with no modification. The selector receives and translates subscriber dialing pulses and selects the appropriate level and outlet path of the relay matrix. Each selector unit may be added to either a three-wire system with loop supervision or a four-wire system having a fourth wire supervision. The level size of the selector is flexible from one to forty outlets per level as selected by strapping (i.e. wiring between alternative strapping posts). The selector is capable of translating two or three digit codes and assigning the translated code to any level. This operation is possible because the selector does not process a call until it receives a complete digit or code; that is, it does not store and repeat digits because it is a selector rather than a register sender.

The selector described herein is rendered flexible in operation by means of the strapping alternatives provided as part of the system design. Strapping is achieved using wire wrapping or strapping clips between strapping posts. For example, FIG. 3 illustrates one of five possible matrix cards which can be utilized in the system. Each matrix card includes ten independent groups of eight relays and each group of relays is associated with one selector. Any number from one to five matrix cards may be associated with a selector. Each matrix card must be strapped to respond to signals from the selectors in accordance with the matrix card number. Therefore, the strapping post designated C in FIG. 3 is connected to either of strapping posts 1, 2, 3, 4 or 5, in accordance with the number of that matrix card. All groups of strapping posts on any one matrix card must be strapped in the same manner so that the entire matrix card with its common outlets can be addressed in the same fashion by each of the selectors.

Rather than confining the user of the system to the usual ten levels of ten outlets each, the present selector permits a plurality of variable size levels. Generally, the user determines the number of outlets required for the smallest level. Larger levels consist of multiples of this outlet group size. There are sixteen strapped selectable groups of from one to ten outlets in the disclosed embodiment. Modifications in digit treatment techniques can be utilized to expand the number of groups. All groups have the same number of outlets except the last group in which the total number of outlets is reduced because this number is frequently not a direct multiple of group size. For example, if two levels of five outlets, three levels of ten outlets, and one level of fifteen outlets are required, the outlet group size is five, with five outlet levels consisting of one group each, the ten outlet levels of two groups each, and the fifteen outlet level of three groups. If one level is smaller than the others, the user may select a larger group size, leaving unused a few outlets in the small level. For example, six levels of ten outlets each and one level of two outlets could be accomplished with the six levels, each consisting of five groups of two outlets, plus one level consisting of one group of two outlets; or it could be accomplished with six levels each consisting of one group of ten outlets plus one level with one group of ten outlets in which eight are not used. Importantly, the quantity of outlet groups, and hence the highest outlet group number, is limited by the quantity of outlets provided as determined by the number of matrix cards used. Each matrix card provides twenty-four four-wire or thirty-two three-wire outlets. Therefore, the highest whole outlet group number is the number of matrix cards times twenty-four or thirtytwo divided by the outlet group size. The remainder is the quantity of outlets in the next higher numbered outlet group. If the remainder is zero then there is no partial outlet group.

GENERAL OPERATION

Referring to the drawings in general, the present selector may be utilized as a first or intermediate type selector, responsive to either loop or simplex dialing. It may be applied in either a battery or absence of ground searching stage-by-stage switching system. During idle operation the selector receives a resistive battery or absence of ground signal on its S (sleeve) terminal in FIG. 1A.

SEIZURE MODE

The equipment preceding the selector tests the selector for an idle condition at the S terminal. The selector may be seized by either simplex or loop detection via the T(tip) and R(ring) terminals at the detector circuit comprising transistors Q1, Q3 and differential amplifiers A1, A2. In addition the selector may receive a ground signal on its S terminal. Ground forward on the S terminal establishes a busy condition which prevents access by other equipment much more quickly and aids in preventing double seizure occurrences. A loop or simplex seizure path of the T and R terminals must also be received in order to maintain the circuit in stable seized condition.

When seizure occurs the BY relay in FIG. 1A operates and places a ground on the S terminal, thereby holding the preceding equipment. The seize lamp LED-2 and busy lamp LED-3 are actuated and the selector prepares to receive dialed digits. The dial tone circuit (illustrated in detail in FIG. 5) returns dial tone to the calling station. The trouble timing circuit 27 (illustrated in detail in FIG. 4) initiates a timing period of one, two or four minutes, depending upon the strapping alternative selected. If the call is not completed through the selector before the strapped time period has elapsed, the timer de-energizes the BY relay. When de-energized, the BY relay removes the holding ground from the S terminal, thereby releasing the preceding equipment. The selector returns to the idle mode.

DIAL PULSE RECEIVING MODE

Dial pulses are received as level changes on the T and R terminals for both loop and simplex operations. For loop operation, the dial pulses are a series of openings and closures of the line. For simplex operation the dial pulses are a series of pulses which change from resistive ground to resistive battery or open. The first dial pulse received starts a 180 msec timer which holds during pulses for each digit. At the end of the digit this timer releases to signal completion of the digit. The digit treatment or absorbing circuit 78 then processes the digit. If the selector is being utilized as first selector, dial tone is removed from the line.

SCANNING FOR AN IDLE OUTLET

The digit treatment unit 78 is strapped to program the selector for office switching requirements. The types of digit treatment are:

AR (absorbed repeatedly);
A (absorb and unlock);
B (block);
LN (level restrict); and
N (normal).

When an N (normal) type digit is received by digit treatment circuit 78 and the 180 msec timer releases at the end of the digit, the digit treatment circuit provides a SCAN signal to start the selector sequencer 30. The Q9 output signal from the sequencer advances counter 79 in the digit treatment circuit 78. The digit treatment circuit 78 compares the stored digit or digits through the strapped outlet group to be tested, a MATCH signal is provided to stop the selector search for an idle outlet within the outlet group. If no idle outlet is found, busy tone is returned to the calling station. If an idle outlet is found, the sequencer 30 is stopped and the selector is cut-through to the idle circuit. The T and R lines are extended through the selector to seize succeeding equipment. The succeeding equipment returns ground on its S terminal (via the relay matrix of FIG. 3), holding the selector and the preceding equipment. Identification of the outlet used is stored and a matrix path is held. The selector BY relay is de-energized and LED-2 and LED-3 are turned off. The CT (cut through) relay is generated and LED-4 is lighted. After the CT relay is energized, the timing in the trouble timing circuit 27 is terminated.

MATRIX CONTROL

Figure 3A:
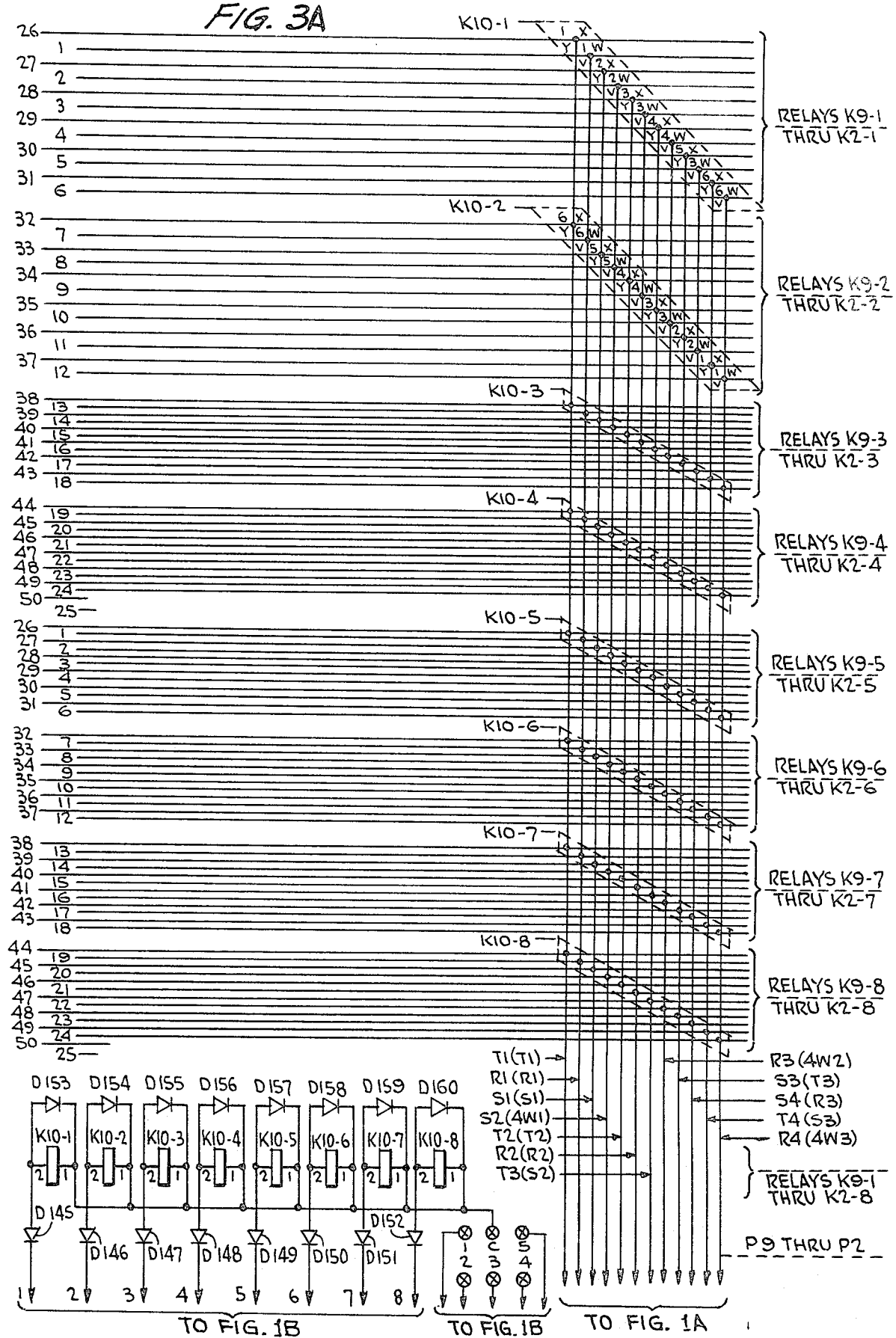

The relay matrix of FIGS. 3A and 3B is made of up to five matrix cards. Each matrix card contains the matrix paths of thirty two outlets (three-wire matrix) or twenty four outlets (four-wire matrix) for ten selector circuits. The total number of outlets provided with five matrix cards is one-hundred sixty three (3) wire circuits or one-hundred-twenty-four wire circuits (outlets). Battery and ground used for matrix relay operation is supplied by the associated selector circuit. Each matrix card contains a total of eighty relays (K1-1 thrugh 8 to K10-1 through 8), there being eight relays for each of the ten selector circuits. Each relay is a twelve-pole device and therefore contains four three-wire paths or three four-wire paths. Each set of eight relay coils associated with one selector is strapped in the same manner to the C strapping post. That is, the C strapping post is strapped to the strapping post numbered to correspond to the matrix card position in the matrix cage. Each relay has an individual path to its other winding terminal through respective diodes D1–D8, D145–D152 etc. The outlet testing sequence starts after an N(normal) digit or digits have been detected by the digit treatment circuit 78. The strapping in the digit treatment circuit selects the outlet group or groups and controls a number of outlets per group to be searched. As noted above, the selector advances counter 79 in digit treatment circuit 78 until a match occurs. At this time the digit treatment circuit signals the selector with a MATCH signal to start outlet scanning. Since the selector advances counter 79 to the outlet group number, this number is directly related to the matrix card on which the outlet group is located. Frequency divider 57 completes the path to operate the appropriate relay on the matrix card selected by frequency divider 58. The outlets of the operated matrix relay are tested via lines TST1-4 at flip-flops 65, 66, 67 and 68. The outlet of the operated matrix relay to be tested first depends on the position of the scanner 40. The position of the scanner is controlled by the number of outlets per outlet group. Each matrix relay contains three or four paths and if the first path is the one to be tested, the scanner sets to test that path. Each path for which a match remains present, is tested for idle by testing the S signal for that path. If an idle path is not found within the operated matrix relay, the scanner resets and the operated matrix relay is released. The next matrix relay to be tested is operated after a delay of approximately five msec to prevent two relays operating at once, if the size of a group requires testing of one or more outlets in the next relay. If an idle path is located, the scanner is stopped and the matrix path is held. The selector includes four relays KA, KB, KC and KD, each operated in response to triggering of a respective flip-flop 68, 67, 66 and 65. When an idle path is located one of these relays is energized. The resulting closure of the normally open contacts, combined with the operation of the CT relay, completes the path through the selector. If no idle path is located the scanner advances through all of the matrix relays and the BT relay operates. This causes return of the BT (busy tone) to the calling station. When the call is completed, the matrix, if operated, is released.

RELEASED MODE

At the time of release, ground is removed from the S terminal by the succeeding equipment which previously held the selector. Removal of ground from the S terminal releases the matrix and restores the selector to the idle condition.

DETAILED OPERATION

Idle Mode

During the idle mode all transistors are cut off, all relays are released, and all lamps are extinguished. Clock 31 provides pulses to sequencer 30 with no effect. A minus 50 volt resistive battery signal or an absence in ground is present on the S terminal of the selector.

SEIZURE MODE

During loop seizure operation the station loop current is received on the T and R terminals. The loop current is detected by operational amplifiers A1 and A2. The output signal from amplifier A2 becomes positive and forward biases NPN transistor Q3, changing the collector of that transistor from a logic 1 to a logic 0 state. If loop seizure mode is selected, the L strapping posts are connected in a collector circuit of transistor Q3 so that the logic 0 is passed to the 22 msec delay circuit comprising resistor R26 and capacitor C5. If the circuit is arranged to operate in the simplex seizure mode, the S strapping posts connected to resistors R3 and R5 are connected. A resistive simplex ground is received on the T and R terminals. This resistive ground forward biases transistor Q1, changing the collector from logic 1 to logic 0 and providing the seizure signal directly to the 22 msec timer comprising resistor R26 and capacitor C5.

For the ground forward seizure operating mode, the GF strapping posts in the collector circuit of transistor Q2 are connected. The preceding equipment provides a ground on the S terminal prior to forwarding the loop or simplex seizure on terminals T and R. The ground of terminal S forward biases diode D11, diode D6, and transistor Q2. The collector of transistor Q2 changes from logic 1 to logic 0 which is applied to the delay circuit comprising resistor R26 and capacitor C5. Seizure on the T and R terminals must also be received to hold the circuit. The ground forward seizure aids in preventing double connections by immediately showing a busy on the sleeve terminal.

Whichever approach is used for seizure detection, the logic 0 signal is delayed 22 msec before being passed on to Schmitt Trigger 11 which responds by providing a logic 1 output level. This logic 1 is applied to the seizure lamp LED-2, NOR gate 13, OR gate 12, and Schmitt Trigger 26 (via diode D9). The logic 1 applied to NOR gate 13 has no effect at this time. OR gate 12, however, provides a logic 1 output signal which is designated A+CT and which is applied to the single digit absorbing circuit 78 in FIG. 1B.

Schmitt Trigger 26 responds to the logic 1 output level from Schmitt Trigger 11 by providing a logic 0 output signal which is applied to NOR gates 13 and 20 with no effect at this time. The logic 1 output signal from Schmitt Trigger 26 is also applied as the $\overline{BY}$ signal to the trouble timing circuit 27, to the busy flip-flop (NOR gates 54, 55) and to inverter 23. The busy flip-flop is thus primed and awaits actuation. Inverter 23 provides a logic 1 output signal which actuates driver amplifier 24 to cause the BY relay to operate along with the busy lamp LED3. In addition, the logic 1 output signal from inverter 23 is applied to NOR gates 16 and 19. The output signal from NOR gate 16 changes to logic 0 to provide the $\overline{BY+H}$ (busy plus hold) signal which removes the reset from the four test flip-flops 65, 66, 67 and 68. NOR gate 19 provides a logic 0 output signal which removes the reset signal from the single digit absorbing circuit 78 and enables NOR gate 21. NOR gate 21 provides a logic 1 output signal to operate Schmitt Trigger 22 and provide the NEW DIGIT signal. The logic 0 NEW DIGIT signal removes the reset from the outlet counter 29, enables OR gate 46, and triggers Schmitt Trigger 48. OR gate 46 provides a logic 0 output signal which removes the reset from the scanner frequency divider 40 and the matrix operate delay flip-flop 32. Schmitt Trigger 48 provides a logic 1 signal which primes NAND gate 49. The NEW DIGIT signal also removes the reset from the matrix frequency dividers 57 and 58 as well as flip-flop 51.

Energization of the busy relay results in the grounding of terminal S which holds the preceding equipment.

DIAL PULSE RECEIVING MODE

Dial pulses are received as changes on the T and R terminals, either in loop or simplex format. The received pulses cause transistor Q1 to cycle on and off for the simplex mode and cause transistor Q3 to cycle on and off for the loop mode. This results in Schmitt Trigger 11 cycling on and off with each dial pulse. The dial pulse train provided by Schmitt Trigger 11 causes the SZ lamp LED-2 to flash with each dial pulse. The 330 msec delay provided by resistor R33 and capacitor C8 prevent Schmitt Trigger 26 from responding to the dial pulse train so that Schmitt Trigger 26 remains at the seized logic 0 level.

In response to the first output change (to logic 0 level) of Schmitt Trigger 11, NOR gate 13 is enabled to provide a logic 1 output signal. This logic 1 causes capacitor C7 to charge via diode D7 whereupon Schmitt Trigger 17 is operated to provide a logic 0 output signal. The logic 0 from Schmitt Trigger 17 is applied to NOR gate 20 which provides a logic 1 C signal which remains at the logic 1 level for the duration of the series of dial pulses in a single digit period. The logic 1 C signal is applied to the dial tone circuit to remove dial tone from the line. In addition the C signal is applied to the single digit absorbing circuit 78 and to an input of NOR gate 21. NOR gate 21 responds by changing from logic 1 to logic 0 and restoring Schmitt Trigger 22 to logic 1. The output signal from Schmitt Trigger 22 is the NEW DIGIT signal which resets the outlet storage counter and scanner in the manner described above.

NOR gate 13 is enabled and disabled with each dial pulse received; however, Schmitt Trigger 17 does not change due to 180 msec delay provided by resistor R30 and capacitor C7.

The train of pulses from Schmitt Trigger 11 are applied to OR gate 12 which provide a similar train of output pulses following the dial pulses. These dial pulses thus appear on the signal A+CT. The single digit absorbing circuit 78 counts and stores the dial pulses on the A+CT signal line. At the end of each series of dial pulses comprising a digit, the output signal from Schmitt Trigger 11 remains at logic 1. The pulses on the A+CT signal line terminate and the SZ lamp LED-2 remains steadily lit. NOR gate 13 responds by providing a steady logic 0 output level which permits discharge of capacitor C7 through resistor R30. At the end of the RC delay, which is approximately 180 msec, Schmitt Trigger 17 releases. This returns the NEW DIGIT and C signals to the seized logic 0 state. The logic 0 NEW DIGIT signal releases scanner 40 and resets the outlet counter 29. The logic 0 C signal is applied to the single digit absorbing circuit 78 to provide an indication that digit treatment translation should begin.

Each received digit causes the same sequence of operation, with the exception of removal of the dial tone which, once removed, remains off for the duration of the call.

SINGLE DIGIT ABSORBING OPERATION

Figure 2:
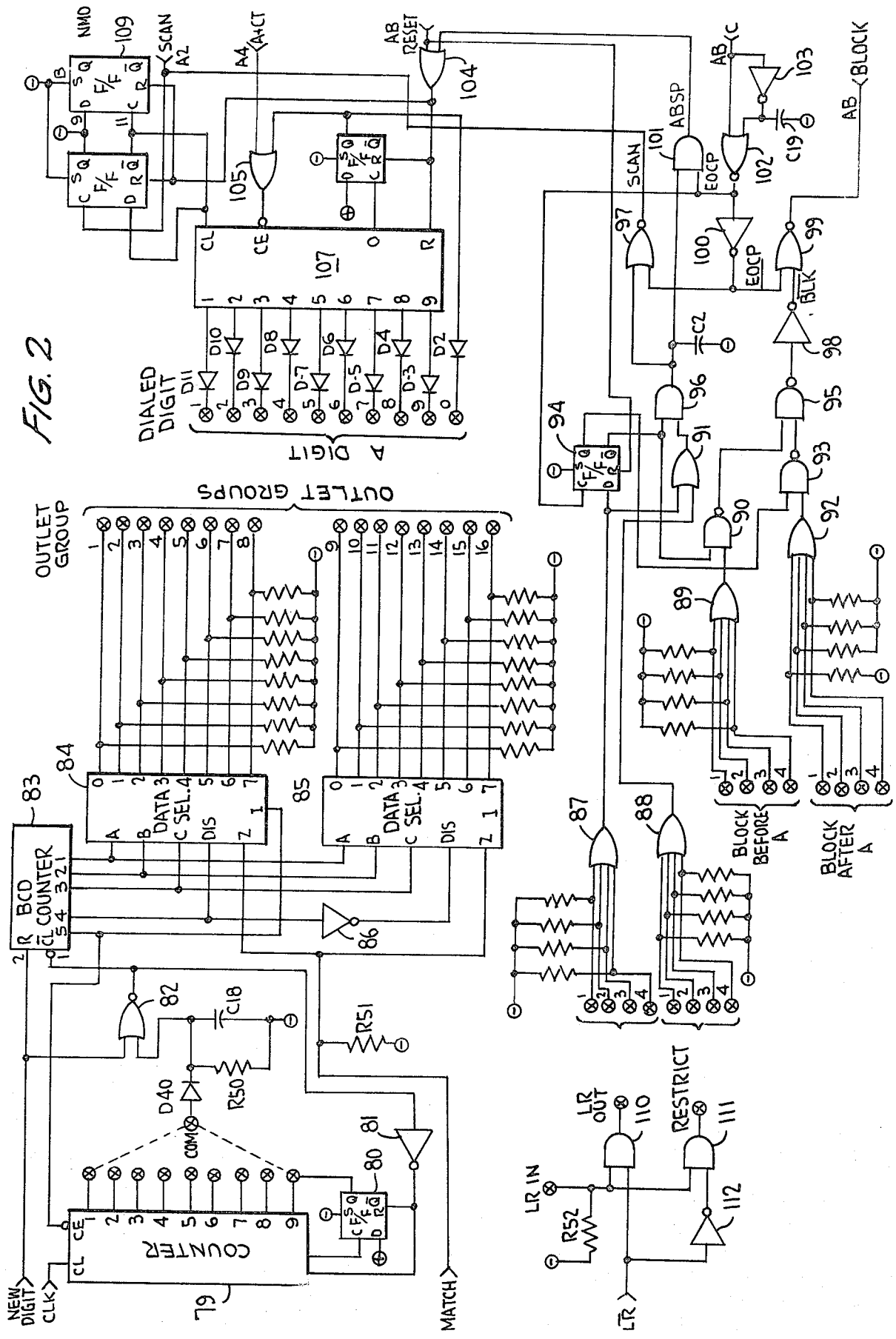
FIG. 2 is a schematic diagram of the digit treatment circuit which forms part of the selector circuit of the present invention.

Referring specifically to FIG. 2, during seizure the A+CT signal changes from logic 0 to logic 1 and is applied to OR gate 105. The reset signal from NOR gate 19 (FIG. 1A) changes from logic 1 to logic 0 during seizure and is applied to OR gate 104 and to the reset input terminal of flip-flop 94. OR gate 104 removes the reset from digit storage counter 107 and the NMD (no more digits) counter 108, 109.

During the digit receiving mode, the C signal from NOR gate 20 (FIG. 1A) changes from logic 0 to logic 1 at the start of each series of pulses. The pulses are received on the A+CT signal line as alternating logic changes. The C signal is applied to NOR gate 102 and inverter 103. Inverter 103 responds to the logic 1 C signal by providing a logic 0 output signal which discharges capacitor C3 and is applied to a second input of NOR gate 102. NOR gate 102 does not operate at this time. The pulses on the A+CT signal line actuate NOR gate 105 which provides an output pulse train that follows the dial pulses and operates the dialed digit counter 107. Each pulse advances counter 107 one step. If a 0 digit is dialed the 0 output of counter 107 clocks flip-flop 106 which is thereby set. In this regard it should be noted that the 0 digit is represented by a series of ten pulses. Flip-flop 106 provides a logic 1 output signal which is applied to the 0 strapping post via diode D2. If any of digits 1–9 is dialed, a logic 1 is applied to the correspondingly numbered strapping post at the output of dialed digit counter 107.

At the end of the dialed digit, signal A+CT stops pulsing and, after approximately 180 msec, signal C returns to logic 0. The dialed digit is now stored in digit counter 107 and flip-flop 106 and appears at the corresponding strapping post. The return of the C signal to logic 0 actuates NOR gate 102 and restores inverter 103 to a logic 1 output level. The logic 0 provided at the output terminal of inverter 103 charges capacitor C19 which, when fully charged, applies a logic 1 to the second input terminal of NOR gate 102. NOR gate 102 is thus enabled and is therefore seen to provide a short pulse of logic 1 level determined by the charge time of capacitor C19. This pulse is designated the EOCT pulse representing the end of the series of digit pulses in one digit.

One mode of operation for the digit absorbing circuit 78 is the AR or absorb repeatedly mode. Upon receipt of an AR digit, the digit is translated by strapping and the control logic to reset the dialed digit counter 107. No scanning for an idle outlet takes place. A selected AR type digit is strapped to the AR1–4 strapping posts. For example, assume that the dialed digit 2, appearing at the strapping posts at the output of counter 107, is strapped to the AR strapping post 1. When this digit is dialed and stored in counter 107, OR gate 88 provides a logic 1 output signal to OR gate 91. OR gate 91, in turn, provides a logic 1 signal to AND gate 96 which had been primed by the reset flip-flop 94. AND gate 96 therefore provides an output ABS signal which is applied to NOR gate 97 and AND gate 101. NOR gate 97 remains off whereas AND gate 101 is primed waiting for the EOCP signal. After a delay of approximately 180 msec (at the end of a digit) the EOCP signal is received and enables AND gate 101 to provide the ABSP signal to OR gate 104. This gate resets the dialed digit counter 107 and flip-flop 106. With the dialed digit counter released logic 1 is removed from the dialed digit strapping post 2 and the circuit is restored to its seized state.

Another mode of operation of the digit absorbing circuit is the A or absorb and unlock mode. In this type of operation a selected digit is stored in the dialed digit counter 107, translated by strapping and the control logic to reset that counter. Any other type of digit next received is then treated as an N (normal) digit except for a B (block) or LR (level restrict) digit. No scanning for an idle outlet takes place in the A mode. The A type digit is strapped to the A strapping posts at the input to OR gate 87 from the strapping posts at the output of dialed digit counter 107. When an A type digit has been dialed, OR gate 87 provides a logic 1 output signal to the D input of flip-flop 94 and to one input of OR gate 91. Flip-flop 94 is thus prepared to operate when it is clocked. OR gate 91 provides a logic 1 output signal to AND gate 96 which changes its output level from logic 0 to logic 1. The logic 1 from AND gate 96 is applied to NOR gate 97 and to AND gate 101. NOR gate 97 is maintained in its off state whereas AND gate 101 is primed to await the EOCP signal. After approximately 180 msec delay (at the end of a digit) the EOCP signal is applied to AND gate 101 and to the clock input terminal of flip-flop 94. Flip-flop 94 is set thereby providing a logic 1 output signal at its Q output terminal to prime NAND gate 93 which operates in the block after A type digit treatment mode. The $\overline{Q}$ output signal changes to logic 0 at flip-flop 94 and is applied to AND gate 96 and NAND gate 90. The effect of this level change at AND gate 96 is to disable the AR digital treatment; the effect of this level change at NAND gate 90 is to disable the block before A digit treatment. AND gate 101 provides an output pulse to the logic 1 level on the ABSP line. This pulse actuates OR gate 104 which in turn resets the dialed digit counter 107 and flip-flop 106. With the dialed digit counter released, logic 1 is removed from the dialed digit strapping post. The digit absorbing circuit is now set in the unblock position wherein any subsequent digit, other than block after A, is considered normal due to the state of flip-flop 94.

Another mode of operation of the digit treatment circuit 78 is the B before A or block before absorb and unblock mode. If a B before A digit is received before an A type digit, the circuit blocks further dialing and returns busy tone (BT) to the calling station. If a B before A digit is dialed after an A digit, the B before A digit will be considered as an N (normal) digit. In this mode the dialed digit strapping post corresponding to the selected B before A digit is strapped to one of the four BLOCK before A strapping posts feeding OR gate 89. When a B before A digit is dialed, OR gate 89 provides a logic 1 output signal which is applied to NAND gate 90. NAND gate 90 provides a corresponding logic 0 signal which is applied to NAND gate 95, the output from NAND gate 95 changing to logic 1. This drives inverter 98 to provide a logic 0 output signal to NOR gate 99 which does not change state at this time. After a delay of approximately 180 msec (at the end of the dialed digit) the EOCP signal is received at inverter 100 which momentarily operates to provide a logic 0 pulse which operates NOR gate 99. NOR gate 99 provides a logic 1 pulse on the BLOCK signal line. The BLOCK signal is applied to NOR gate 55 in FIG. 1B which in turn provides a logic 0 output signal. This change is reflected in NOR gate 54 which provides a logic 1 level on the BT (busy tone) signal line. The logic 1 BT signal is applied to NOR gate 55, driver amplifier 56, and OR gate 18 (FIG. 1A). The logic 1 applied to NOR gate 55 holds that gate in its logic 0 position to maintain a logic 1 BT signal output from NOR gate 54. Driver amplifier 56 actuates the BT relay and the busy tone lamp LED-5. OR gate 18 is actuated by the logic 1 BT signal to provide a logic 1 INHIBIT C signal at NOR gate 13 (FIG. 1A), NOR gate 37 (FIG. 1B) and the clock inhibit terminal CE at each of scanner divider 40, frequency divider 57 and frequency divider 58. The effect at NOR gate 13 is to maintain that NOR gate in its off position, disabling the 180 msec digit series timer comprising capacitor C7 and resistor R30. The INHIBIT C signal applied to NOR gate 37 resets sequencer 30 via Schmitt Trigger 38 to prevent the scanner from running. Operation of the BT relay via driver amplifier 56 by the BT signal closes the normally open BT contacts in the upper left hand corner of FIG. 1A to provide busy tone to the calling station.

Another mode of operation of the single digit absorbing circuit 78, illustrated in detail in FIG. 2, is the B after A mode, or the BLOCK after absorb and unblock mode. In this mode, if a B after A digit is dialed after an A type digit, the circuit blocks further dialing and returns busy tone to the calling station. If the B after A digit is dialed before an A digit, the B after A digit is considered as either an AR or N type digit. The selected B after A digit is strapped from the corresponding strapping post at the output of dialed digit counter 107 to one of the BLOCK after A strappings posts connected to the input of OR gate 92. If an A type digit has previously been dialed, flip-flop 94 is set and provides a logic 1 Q output signal to prime NAND gate 93. The next B before A digit actuates OR gate 92 to provide a logic 1 at the second input terminal of NAND gate 93. NAND gate 93 responds with a logic 0 signal applied to NAND gate 95 which in turn provides a logic 1 signal to inverter 98. Inverter 98, in turn, provides a logic 0 signal on the $\overline{BLK}$ (block) signal line to NOR gate 99. This has no effect at NOR gate 99 at this time. After a delay of approximately 180 msec (at the end of the dialed digit) the EOCP signal is received at inverter 100 which provides a logic 0 signal to the second input of NOR gate 99. During the momentary EOCP pulse NOR gate 99 provides a logic 1 signal on the BLOCK signal lead. The logic 1 BLOCK signal is applied to NOR gate 55 in FIG. 1B. Operation proceeds in the manner described above concerning the B before A mode when a logic 1 pulse is received at NOR gate 55.

Another mode of operation of the circuit of FIG. 2 is the LR or level restrict mode. In this mode the single digit absorbing circuit operates to prevent access to specific outlet groups by lines having a ground on the LEVEL RES. (level restrict) terminal at the left side of FIG. 1A. Examples of these paths of lines would be coin telephone lines which are denied access to direct distant dialing using the digit 1 as a prefix. The LR digit at the output strapping posts from dialed digit counter 107 is connected to the LR IN strapping post at the input to AND gate 110. For example, if digit 1 is considered as an LR digit, the strapping post 1 at the output of counter 107 is connected to the LR IN strapping post at the input to AND gate 110. In addition, the LR OUT strapping post at the output of AND gate 110 is strapped to the strapping post or posts corresponding to the outlet groups to be restricted at the right hand side of data selector 84 and 85 of FIG. 2. In addition, the RESTRICT strapping post at the output of AND gate 111 is connected to one of the BLOCK before A strapping posts at the input to OR gate 89, or one of the BLOCK after A posts at the input to OR gate 92 (as required). The RESTRICT strapping post may also be strapped to an outlet group being routed to intercept or to any other desired routing within the switching system. When the selector is seized and a ground level appears on the LEVEL RES signal line, Schmitt Trigger 28 (FIG. 1A) provides a logic 0 level on the $\overline{LR}$ signal line. This logic 0 level is supplied to AND gate 110 and inverter 112 in FIG. 2. This disables AND gate 110 but provides a logic 1 at the input to AND gate 111 which is thereby primed. When an LR access digit is dialed, the corresponding dialed digit strapping post provides a logic 1 at the LR IN strapping post which is then applied to the second input of AND gate 111. AND gate 111 provides a logic 1 RESTRICT signal to effect operation in the BLOCK before A mode, or BLOCK after A mode, (as described above) via OR gate 89 or 92. If the LEVEL RES terminal was not grounded upon seizure, the $\overline{LR}$ signal is at the logic 1 level. Upon dialing of an LR digit AND gate 110 is energized to provide the logic 1 LR OUT signal. Since the LR OUT strapping post is connected to one or more outlet group strapping posts, the call is completed as though an N type digit is dialed. This operation is described below in the description of the normal mode.

Another mode of operations of the single digit absorbing circuit of FIG. 2 is the N or normal mode. In this mode, dialing of an N type digit causes the selector to scan for an idle outlet. N type digits are strapped from the dialed digit strapping posts at the output of counter 107 to the outlet group strapping posts at the inputs to data selector 84 and 85. When an N type digit is dialed, the dialed digit strapping post corresponding to that digit provides a logic 1 to each of the outlet group strapping posts to which that dialed digit strapping post is connected. After a delay of approximately 180 msec (at the end of a dialed digit) the EOCP signal is received at inverter 100 providing a logic 0 pulse from that inverter. This logic 0 pulse actuates NOR gate 97 (because the dialed digit was not strapped to A or AR, or flip-flop 94 was previously set, so that AND gate 96 did not output an ABS logic 1 to NOR gate 97) to provide a SCAN pulse which advances the count in counter-connected flip-flops 108 and 109. In addition the SCAN pulse is applied to the circuitry in FIG. 1B with the effects to be described below in relation to the mode concerning scanning for an idle outlet in the selector circuit.

When the selector begins scanning for an outlet, pulses are provided at the Q9 output terminal of sequencer 30. These pulses are designated CLOCK and are received at the single digit absorbing circuit at counter 79. The CLOCK pulses occur at the end of one outlet step or at the start of the next outlet step. Each received CLOCK pulse advances the outlet counter 79. The number of outlets per group is determined by office requirements. Generally, this would be the number of circuits per outlet group which best utilizes the maximum number of equipped outlets. There are ten strapping posts connected at the output of counter 79 and flip-flop 80. One of these strapping posts, corresponding to the selected number of outlets per group, is strapped to the COM strapping post. When the count in counter 79 and flip-flop 80 advances to the selected number of outlets per group, a logic 1 appears on the COM strapping post and is applied via diode D40 to NOR gate 82. NOR gate 82 provides a logic 0 output signal which advances BCD counter 83 one count. In addition, the logic 0 output signal from NOR gate 82 drives inverter 81 to provide a logic 1 output signal which resets counter 79 and flip-flop 80. The resetting of counter 79 and flip-flop 80 removes a logic 1 signal from the COM strapping post, thereby releasing NOR gate 82 and inverter 81. With inverter 81 providing a logic 0 output signal, counter 79 and flip-flop 80 are free to again operate in response to the CLOCK input pulses. Counter 83 is a BCD counter which controls data selector 84 and 85. These units are eight to one data selectors. When data selectors 84 and 85 are advanced to the outlet group to be tested, as determined by the presence of a logic 1 strapped from the digit dialed to that outlet group, a logic 1 is provided on the MATCH output signal line. The logic 1 MATCH signal starts selector testing for an idle outlet in the manner described below. It should be noted that idle outlet testing may have begun at the first outlet group if that digit had been dialed. The MATCH lead, therefore may have a logic 1 at the start of a SCAN sequence.

The single digit absorbing circuit 78, illustrated in FIG. 2, permits one digit to be stored. If no action is taken, due to there being no outlet group strapped, and the second digit is dialed, then the NMD (no more digits) signal becomes logic 1. More specifically, after an N type digit is stored, the NMD counter 108, 109 is advanced each time a SCAN is started as signified by a logic 1 level appearing on the SCAN signal line. If the second digit is dialed, the SCAN signal becomes logic 1 again and causes counter 108, 109 to provide a logic 1 on the NMD line. The NMD signal is received by NOR gate 55 in FIG. 1B. The output signal from NOR gate 55 changes from logic 1 to logic 0 and switches the output signal from NOR gate 54 to logic 1. Operation proceeds in the manner described above in relation to providing of a BLOCK signal. The result is that busy tone is returned to the calling station.

SCANNING FOR AN IDLE OUTLET

In general, scanning for a match proceeds rapidly. When a match is found, scanning stops until the associated matrix relay has been operated. Scanning for an idle outlet (and continued presence of MATCH) then proceeds rapidly through the remaining outlets (1 to 4) in that matrix relay. If an idle outlet is not found in a scan step, then the next scan step will test first for MATCH, then for an idle outlet. If an idle outlet is found, scan stops. If all outlets in that relay are so scanned, then that relay is released, and MATCH is tested before operating the next matrix relay. If at any time, MATCH is found at logic 0, the relay presently selected, if any, is released and rapid scanning for MATCH is resumed. Therefore scanning for MATCH is rapid because no matrix relays are operated. Scanning for idle outlets and continued presence of MATCH is rapid within a relay's 3 or 4 outlets, but must pause while another relay is operated, assuming continued presence of MATCH. Rapid scanning for MATCH will resume when MATCH goes to logic 0, because without MATCH at logic 1, no relays need be operated. Scanning for an idle outlet may start and end on any outlet within a matrix relay.

Note that, due to variable outlet size and the possibility of either three or four outlets per relay, frequently a match appears after scanner 40 has already passed some outlets in a relay. F/F 32 & F/F 33 would still sequence before allowing sequencer 30 to continue. Similarly, if no idle outlet is found, MATCHED may go to a logic 0 after only some of the outlets in a matrix relay have been scanned. The relay would then release, and scanning for a match would resume.

When an N (normal) digit has been received by the single digit absorbing circuit 78, and the 180 msec timer (R30, C7, FIG. 1A) terminates at the end of the pulses of one digit, the digit absorption circuit 78 provides a logic 1 pulse on the SCAN lead in the manner described above. This logic 1 pulse is applied to NOR gate 36 which responds by providing a logic 0 signal to NOR gate 37. NOR gate 37 is actuated thereby to provide a logic 1 signal which latches NOR gate 36 in its logic 0 state and which actuates Schmitt Trigger 38 to provide a logic 0 signal to the reset input terminal of sequencer 30. Sequencer 30 is now free to operate. Pulses from CLOCK 31 (at approximately a 64 KHz rate) advance the sequencer to provide logic 1 pulses sequentially at the Q1, Q5, Q7 and Q9 output terminals. The Q1 output pulse from sequencer 30 is applied to the DISP CNT (display count) signal line wherein it clocks counter 29 in FIG. 1A. Counter 29 is an outlet storage counter which counts in binary coded decimal format and is advanced each time the sequencer 30 provides a DISP CNT pulse. Counter 29 therefore contains the outlet number of the outlet being scanned. The number present in counter 29 may be applied to a readout for test purposes to see which of the one hundred sixty outlets is being scanned.

The outlet pulse from terminal Q5 of sequencer 30 is applied to the CLOCK input terminal of flip-flop 32. Flip-flop 32 monitors the MATCH condition in the single digit absorbing circuit 78 via the MATCH signal output from circuit 78 and NOR gate 49 and inverter 50. When circuit 78 locates the outlet group strapped to the dialed digit strapping post, as described above, a logic 1 appears on the MATCH signal line and enables NAND gate 49. The resulting logic 0 level at the output of NAND gate 49 is applied to inverter 50 which provides a logic 1 signal designated MATCHED. The MATCHED signal is applied to the CLOCK input terminal of F/F 51, to one input of AND gate 52, to the data input terminal of flip-flop 32 and to one input of AND gate 34. Flip-flop 51 is set by this logic change and provides a logic 1 level at its Q output terminal. This is applied to AND gate 53 which is enabled to end the SCAN operation.

AND gate 52, AND gate 34 and flip-flop 32 are all enabled by the logic 1 MATCHED signal.

When the Q5 logic 1 pulse from sequencer 30 is received at the CLOCK input terminal of flip-flop 32 after the MATCHED signal is received at the D input terminal of that flip-flop, flip-flop 32 is set to provide a logic 1 Q output signal to the CLOCK input terminal of flip-flop 33. The $\overline{Q}$ output terminal of flip-flop 32 provides a logic 0 signal which is delayed by approximately 5 msec through capacitor C11 and resistor R39 before being applied to Schmitt Trigger 39. The Q output terminal of flip-flop 33 is changed to logic 1 upon receipt of the logic 1 signal at its C input terminal and acts through the CE terminal of sequencer 30 to inhibit further advance of the sequencer count. The $\overline{Q}$ output terminal of flip-flop 32, now at logic 0, is passed through the 33 msec delay circuit comprising capacitor C10 and resistor R38 to Schmitt Trigger 35.

After the 5 msec delay occasioned by capacitor C11 and resistor R39, Schmitt Trigger 39 provides a logic 1 output signal to AND gate 52. AND gate 52 had previously been primed by the MATCHED signal and therefore operates in response to Schmitt Trigger 39 to provide a logic 1 at each of AND gates 59 through 63. These AND gates 59 through 63 monitor the matrix card counter 58. Specifically, counter 58 provides a logic 1 level on one of its Q0 through Q5 output terminals. The particlar one of the outputs energized with a logic 1 level corresponds directly to the matrix card currently being scanned. Specifically, the Q0 output level corresponds to matrix card 1, the Q1 output signal corresponds to matrix card 2, the Q2 output signal corresponds to matrix card 3, the Q3 output signal corresponds to matrix card 4 and the Q4 output signal corresponds to matrix card 5. The Q5 output signal corresponds to an additional count and has no correspondence in matrix card number. Therefore, one of AND gates 59-63 operates in response to the output signals from AND gate 52 to provide a logic 1 signal at the corresponding strapping posts 1-5 in FIG. 3. At the same time a logic 1 output signal is present at one of the eight outputs of the divide-by-eight frequency divider 57. This logic 1 signal is converted to a logic 0 signal by an appropriate inverter and connected to the winding of one of the relays 1-8 in a set of relays in FIG. 3. Therefore, one of the relays in the matrix of FIG. 3 is energized via a path extending from one of AND gates 59-63, one of strapping posts 1-5 and C, and the inverter connected to the activated output of frequency divider 57.

The actuated relay in the matrix circuit connects twelve wires from the succeeding equipment to the selector at the upper right hand corner of FIG. 1A. If the system operates as a three-wire system, the twelve wires correspond to four complete circuits each comprising a T,R,S and 4W signal. If the system operates on a four-wire basis, the twelve wires comprise four three-wire signals including only the T, R and S signals. The selector utilizes the S signal in each case for testing each circuit for idle.

At the expiration of the 33 msec delay effected by resistor R38 and capacitor C10, Schmitt Trigger 35 is energized to provide a logic 1 output signal which resets flip-flop 33. The Q output signal from flip-flop 33 returns to the logic 0 state while the $\overline{Q}$ output signal returns to the logic 1 state. The Q logic 0 signal permits sequencer 30 to resume counting; the $\overline{Q}$ logic 1 signal releases Schmitt Trigger 35 to remove the reset signal from flip-flop 33.

Sequencer 30 provides a logic 1 signal at its Q7 output terminal which is applied to AND gate 34. If the MATCHED signal is at the logic 1 level, AND gate 34 provides a strobe signal at the logic 1 level to AND gates 42, 43, 44 and 45. At this time the scanner frequency divider 40 has the logic 1 level on one of its output terminals Q0, Q1, Q2, or Q3. The corresponding AND gate 42, 43, 44 or 45 is enabled to clock one of flip-flops 65, 66, 67 or 68. These flip-flops are utilized to perform the idle test procedure. When the Q9 output signal from sequencer 30 is provided at the logic 1 level it clocks the scanner frequency divider 40 as well as counter 79 in the single digit absorbing circuit 78.

The scanner frequency divider 40 is advanced one step with each CLOCK pulse received. The various Q output terminals change to logic 1 in turn with terminals Q0, Q1, Q2, Q3 and Q4 being utilized for the three-wire matrix operation and terminals Q0, Q1, Q2 and Q3 being utilized for four-wire matrix operation. Each time the scanner divider 40 is advanced to Q3 or Q4 (depending on whether the circuit is strapped for three-wire or four-wire operation), NOR gate 41 provides a logic 0 output signal. This signal is delayed by the time delay circuit comprising capacitor C12 and resistor R40 before being applied to Schmitt Trigger 47. The output signal from Schmitt Trigger 47 changes to logic 1 and serves to clock frequency divider 57 while driving the output signal from OR gate 46 to logic 1. This output signal from OR gate 46 is designated the NEXT RELAY signal and is applied to the reset terminal for scanner divider 40 and the reset terminal for flip-flop 32. Scanner divider 40 is thus reset to its zero count position wherein a logic 1 level appears at the Q0 output terminal. This is the starting position for a matrix relay count. The resetting of flip-flop 32 causes the Q output signal from that flip-flop to go to logic 0 with no effect at this time. The $\overline{Q}$ output signal from that flip-flop 32 releases Schmitt Trigger 39 to remove the operate path for the set of eight matrix relays. Specifically, Schmitt Trigger 39 provides a logic 0 signal which inhibits AND gate 52 to remove the enabling signal from each of AND gates 59–63. With all of AND gates 59–63 inhibited, no energization path is provided at the strapping post side of the relays in the matrix of FIGS. 3A and 3B.

In response to the next pulse from sequencer 30 the flip-flop 32 is once again set. This causes Schmitt Trigger 39 to operate once again after a delay of 5 msec caused by resistor 39 and capacitor C11. The operating path for the eight relay set in the matrix is restored via AND gate 52 and one of AND gates 59–63, depending upon the count and frequency divider 58.

Matrix relay frequency divider 57 is advanced one step in response to each four or three steps of the scanner frequency divider 40 (depending upon three or four-wire circuit operation). Upon advancing a count, frequency divider 57 releases the operated matrix relay and extends an operation path to the next relay. If the MATCH signal is at logic 1 when counter 57 advances, the next matrix relay in sequence is operated after a 5 msec delay.

The matrix count is stored in frequency dividers 57 and 58. Counter 57 provides eight counts and then resets while advancing counter 58 one step. Each selective circuit in the system has eight matrix relays per matrix card. Each matrix relay controls twelve lines corresponding to four or three circuits depending upon the operational mode.

TESTING FOR IDLE CIRCUITS

When a matrix relay in FIG. 3 is operated, it connects three or four circuits through the matrix to the selector from succeeding equipment. The selector tests the S signal of each circuit for an idle condition, one at a time, in sequence. That is, if there are three circuits connected through the relay, the sequencer tests the S signal for each of the three circuits in sequence; likewise, for four circuit connections, the sequencer tests the four S signals in sequence. This testing is effected by the TST1, TST2, TST3 and TST4 signals derived in FIG. 1A.

These signals correspond to the S signals for the mode of operation of the system. These TST signals are applied to respective Schmitt Triggers 161, 160, 66 and 64 which operate to provide a logic 1 output signal if the circuit being tested is idle. This logic 1 signal from the Schmitt Trigger is applied to the data(D) input signal terminal of the respective flip-flop 68, 67, 66 and 65. When sequencer 30 provides a binary 1 output signal at its Q7 output terminal, one of flip-flops 65–68 is clocked, depending upon the state of the scanner divider, which enables one of AND gates 42–45. If the clocked flip-flop receives a logic 1 signal from its input Schmitt Trigger 64, 66, 160, 161, indicating that the circuit being tested is idle, the flip-flop is set. When so set, the $\overline{Q}$ output terminal of that flip-flop changes to logic 1 while the Q output signal changes to logic 0. Assuming that flip-flop 65 is so set by way of example, its Q output signal energizes driver amplifier 69 to actuate relay KD. (Similarly, flip-flop 66 actuates relay KC through driver 70; flip-flop 67 actuates relay KB through driver amplifier 71; and flip-flop 68 actuates relay KA through driver amplifier 72). The four $\overline{Q}$ output terminals from flip-flops 65–68 are connected as input signals to NAND gate 73 which provides a logic 1 output signal when an idle circuit is detected. This logic 1 output signal acts through driver amplifier 70 to energize the CT (cut-through) relay and energized the cut-through lamp LED-4. Further, the output signal from NAND gate 73, which is designated the CT signal, is applied to NOR gates 12 and 19 and OR gate 18 of FIG. 1A. NOR gate 19 is held at its logic 0 output state by the logic 1 CT signal, thereby preventing a RESET signal from being generated. OR gate 18 responds to the logic 1 CT signal by providing an INHIBIT C signal at the logic 1 level. OR gate 12 is maintained at the logic 1 output level by the logic 1 CT signal, thereby preventing further changes in the A+CT signal.

The logic 1 INHIBIT C signal is applied to NOR gate 37 which changes the state to terminate counting at sequencer 30. The INHIBIT C signal is also applied to scanner divider 40, frequency divider 57 and frequency divider 58 which precludes further counting at these frequency dividers.

The operated CT relay connects the T and R signals of the calling station through the selector via the selected KA, KB, KC, KD relay contacts, to the T1–T4 and R1–R4 terminals of the circuit to be seized.

The station loop seizes the succeeding equipment via the matrix. When the succeeding circuit is seized, a ground is returned on its S terminal. This holds the circuit and the succeeding equipment.

Energization of the CT relay removes the T and R signals from the loop detector circuit comprising amplifiers A1, A2 and transistors Q1, Q3. Consequently the output signal from this circuit at the collectors of transistors Q1 and Q3 changes state and produces a change of state at Schmitt Trigger 11. As a result, the BY relay is de-energized along with the BY lamp LED3, and the SZ lamp LED2.

If a sequencer steps through all of the outlets equipped with the system, the END SCAN signal becomes logic 1. This is effected at the MS strapping post at the output of frequency divider 58. Specifically, the MS strapping post is connected to the output terminal of frequency divider 58 which corresponds to the number of matrix cards provided. The logic 1 END SCAN signal is applied to NOR gate 37, AND gate 53 and NOR gate 21. NOR gate 37 responds by changing state and stopping sequencer 30. AND gate 53 responds by providing a logic 1 signal to operate the busy latch comprising NOR gates 54 and 55. The busy latch operates the BT relay which, through the contacts in the upper left hand corner of FIG. 1A, returns busy tone to the calling station. NOR gate 21 responds to the END SCAN signal by preventing the NEW DIGIT signal from attaining the logic 1 level.

OPERATION OF DIAL TONE CIRCUIT

Figure 5:
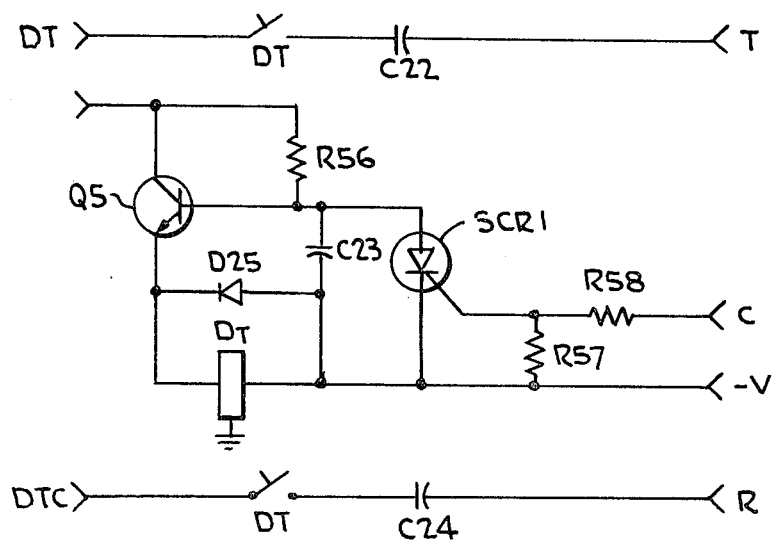
FIG. 5 is a schematic diagram of the dial-tone circuit employed with the selector unit of the present invention.

The dial tone circuit of FIG. 5 operates in the following manner. When the selector is seized, a ground level from the BY relay is applied to the collector of transistor Q5 as the MST signal. This turns transistor Q5 on with the result that relay DT is energized. When relay DT is energized its contacts connect dial tone to the calling station via the DT (dial tone) and DTR (dial tone return) lines. When digit dialing begins a logic 1 is received on the C signal line and triggers SCR 1. When so triggered SCR 1 turns off transistor Q5. The DT relay is de-energized and the dial tone removed from the line.

OPERATION OF THE TROUBLE TIMING CIRCUIT

Figure 4:
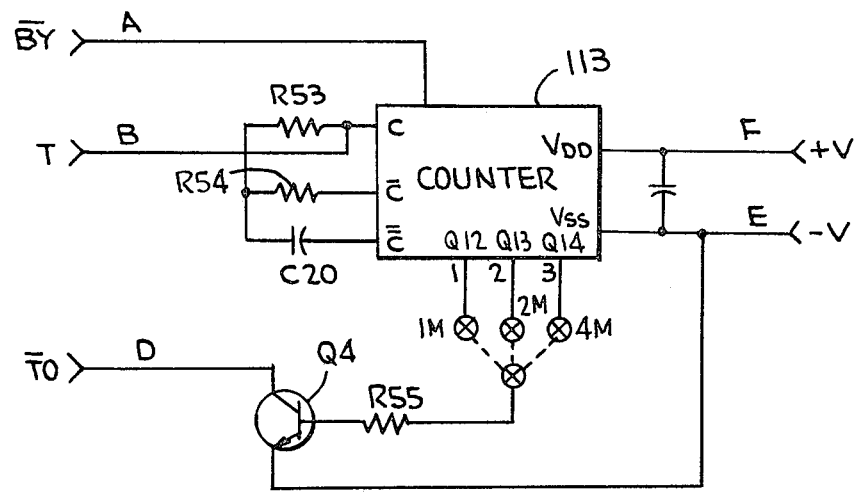
FIG. 4 is a schematic diagram of the trouble-timing circuit employed with the selector of the present invention.

The trouble timing circuit 27 is illustrated in detail in FIG. 4. When the selector is seized a logic 0 appears on the $\overline{BY}$ signal line. This removes the reset which had held counter 113 at a 0 count state. At the end of one minute, strapping post 1M receives a logic 1 signal. At the end of two minutes, strapping post 2M receives a logic 1 signal and at the end of 4 minutes strapping post 4M receives a logic 1 signal. The common strapping post is strapped to either of strapping posts 1M, 2M or 4M as determined by required system operation. When $\overline{BY}$ goes low (logic 0) upon seizure of this circuit, reset is removed from counter 113, allowing it to start counting from 0. If the circuit is held until the strapped post receives a logic 1, transistor Q4 is turned on and provides a TO signal at the logic 0 level. This causes the driver amplifier 24 for the BY relay to release that relay and de-energize the busy lamp LED3. When the BY relay is de-energized it removes the holding ground on the S terminal in FIG. 1A to release the preceding equipment so that the selector can return to its idle mode.

RELEASE OPERATION

If the selector does not cut through after sequencing through all the available paths, busy tone is connected to the calling subscriber. He then disconnects, releasing the seizure on the T and R terminals. This releases the previously operated BY relay. The BY relay, being released, removes the holding ground from the S terminal which releases the preceding equipment. The selector then returns to the idle mode.

If the selector is cut through, ground is removed from the succeeding S terminal by the succeeding equipment. The preceding equipment and the selector return to idle.

The selector described above provides efficient telephone selector operation while requiring considerably less space than required by existing step-by-step or XY selector units. The unit successfully integrates electronic logic and control circuitry while remaining compatible as an add-on selector in existing systems. This feature is extremely valuable in view of the large number of existing systems which require additional selectors to meet expanding service requirements.

The use of twelve-pole relays in the switching matrix is a particularly advantageous feature of the present invention. Specifically, as each relay is energized in turn it connects three four-wire or four three-wire circuits to the selector control logic for testing, depending upon the prior strapping conditions established by the user. This adaptability to three or four-wire systems is unique in the present system and one of the important features of the present invention.

Another feature of the present invention relates to the fact that the twelve-pole relay permits testing of a plurality (three or four) circuits simultaneously. Specifically, the selector examines the circuits of successively energized relays, the examination of the circuits for each energized relay being performed rapidly to determine whether or not each of the examined circuits is available for call routing. This saves considerable time over the procedure whereby a different circuit is connected for examination by energizing a specific relay for that circuit. Furthermore, the integration of this examination procedure with the adaptability to three- or four-wire operation is extremely advantageous in that the selector can operate in either operational mode without requiring redundant circuitry.

Another feature of the invention resides in the fact that component conservation is possible by limiting the number of matrix cards per selector to the number actually needed for service requirements. Matrix cards can be added on as needed to meet expanding service requirements. Further, by appropriate strapping in the single digit circuit 78, various numbering, schemes can be skipped or utilized out of sequence; a consequential advantage of this feature is that further non-sequential outlet groups can be added at a later date. Note that digit treatment is separate from digit skipping and utilization of outlets out of sequence. Mechanical step switches can be made to do the former, but not the latter.

Digit absorption (B before A, B after A, A) allows adaptation to various number schemes. This capability is provided in present mechanical selectors only with extra pieces. The modular nature of the subsystem (selector & SDA plug-on) allows even more complicated digit treatment for very complex numbering plans. This is increasingly important as population growth requires use of virtually every combination of central office codes. While this flexibility is easy to provide in most modern electronic and many common control cross bar offices, it is frequently difficult or impossible in step offices.

A unique and important feature of the present invention is the fact that the pulses comprising a digit are first counted before any switching is performed. This is unique in step-by-step systems wherein a Strowger type switches move in two dimensions to follow each pulse of a dialed digit. This distributed control feature permits the single digit absorbing circuit to first determine whether or not the dialed digit is one that should be utilized before proceeding with actual switching.

It is also possible to replace the single digit treatment circuit with a multi-digit treatment circuit to provide broader digit treatment operation; however, this is not part of the present invention and is not described in detail herein.

The following is a table which defines the meaning and function of each of the signals utilized in the accompanying drawings. This table is provided for reference and to facilitate an understanding of the operation of the system.

| Designation: | Meaning: | Function: | FIG. NO.: |
|---|---|---|---|
| BT | Busy Tone | Busy tone input for extending BT to the calling station when required | 1A |
| BTR | Busy Tone Return | Busy tone source return path | 1A |
| DT | Dial Tone | Dial tone input for extending DT to the calling station | 1A, 5 |
| DTR | Dial Tone Return | Dial tone source return for a balanced DT feed | 1A, 5 |
| LEVEL RES | Level Restrict | Used to restrict the calling station from access to specific outlet groups | 1A |
| R | Ring | One of the pair of transmission input wires used by calling station (T&R) | 1A, 5 |
| R1–4 | Ring 1–4 | One of the pair of transmission output wires to the matrix used by the calling station (T1 through T4&R1 through R4) | 1A |
| S | Sleeve | Used to hold the preceding equipment after seizure, and for idle circuit testing before seizure | 1A |
| S1–4 | Sleeve 1–4 | Used to hold this selector and the preceding equipment after cut-through, and idle circuit testing of succeeding equipment before seizure. S1–S4 go to the matrix | 1A |
| T | Tip | One of the pair of transmission input wires used by the calling station (T&R) | 1A, 4, 5 |
| T1–4 | Tip 1–4 | One of the pair of transmission ouptut wires to the matrix used by the calling station (T1–T4&R1–R4) | 1A |
| 4W | 4th wire | Used to extend the input 4th wire through the selector for four-wire operation | 1A |
| 4W1–3 | 4th wires 1–3 | Used to extend the outout 4th wire to the seized succeeding equipment via the matrix | 1A |
| A + CT | A(Line) or cut-through | Used for repeating dial pulses within the selector, and when cut-through, to inhibit detecting further changes on the line (T&R) | 1A, 1B, 2 |
| BLOCK | Block | Used to operate the busy latch, which operates the BY relay for a blocked call | 1B |
| BT | Busy Tone | Used to prevent digit reset (accepting another digit) when busy tone is sent to the calling station in the event of the station dialing another digit | 1A, 1B |
| $\overline{BY}$ | Busy Not | to prepare the circuit for dial pulse receiving logic 1 while circuit is idle serves to reset counters, F/Fs, and latches | 1A, 1B, 4 |
| $\overline{By + H}$ | Busy Not or Hold | Used to prepare the circuit for idle testing of the succeeding equipment before cut-through, and to hold the selected path after cut-through | 1A, 1B |
| C | Series | Used to indicate the start of a dialed digit and the completion of the pulses of that digit | 1A, 1B, 2, |
| CLOCK | Clock | Used to control the single digit absorption option circuit, when searching to advance the search to the next outlet group | 1B |
| CT | Cut-Through | Used to prevent an improper zero logic pulse on the A + CT lead, and to prevent improper reset of the dialed digit or digits in the digit absorption circuit | 1A, 1B |
| DISP CNT | Display Count | Used to advance the display counter 29 | 1A, 1B |
| END SCAN | End Scan | Used to operate the busy latch at the end of the matrix scan | 1A, 1B |
| INHIBIT C | Inhibit C | Used in a busy tone or Cut-Through mode to stop the Scan and prevent receiving a new digit. Holds the matrix if operated | 1A, 1B |
| $\overline{LR}$ | Level Restrict | Used to restrict the calling station from access to specific outlet groups | 1A, 1B |
| MATCH | Not Match | Used to indicate the start of search for an outlet after a | 1B, 2 |

-continued

| Designation: | Meaning: | Function: | FIG. NO.; |
| --- | --- | --- | --- |
| NEW DIGIT | New Digit | Normal digit has been dialed Used to indicate the start of digit dialing. If it is a digit other than the 1st, it resets outlet storages | |
| NMD | No More Digits | Used to indicate that no action has been taken on the dialed digit This lead sets Busy Tone to be sent to the calling station | 1B, 2 |
| RESET | Reset | Used to prepare the digit absorption circuit for receiving dial pulses and to restore it to normal on release of the circuit | 1A, 1B, 2 |
| SCAN | Scan | Used to start the scanning sequence operation for a match and for an idle outlet at the end of an N (normal) digit | 1B, 2 |
| TST1-4 | Test 1-4 | Used to test via the matrix for an idle sleeve in the succeeding equipment | 1A, 1B |
| ABS | Absorb | Used to stop outlet scanning in response to an absorb digit being dialed | 2 |
| ABSP | Absorb Pulse | Used to reset the dialed digit storage counter when an absorb digit has been dialed | 2 |
| A1-4 | Absorb and Unlock 1-4 | Strapping post for A type digit treatment | 2 |
| AR1-4 | Absorbed Repeatedly 1-4 | Strapping post for AR type digit treatment | 2 |
| $\overline{BLK}$ | Block Not | Used to generate the Block lead | 2 |
| Block After A1-4 | Block After Absorb 1-4 | Strapping post for block after A digit treatment | 2 |
| Block Before A1-4 | Block Before Absorb 1-4 | Strapping post for block before A digit treatment | 2 |
| COM | Common | Strapping post for outlet group size | 2 |
| Dialed Digit 1-0 | Dialed Digit 1-0 | Used to indicate the digit dialed (Strapping post) | 2 |
| EOCP | End of Series Pulse | Used to indicate the end of a dialed digit. Starts outlet scanning, if N (normal) digit is dialed | 2 |
| LR IN | Level Restrict In | Strapping post used for level restriction | 2 |
| LR OUT | Level Restrict Out | Strapping post used for level restriction | 2 |
| OUTLET GROUPS | Outlet Groups | Strapping posts used to determine the number of outlets to be searched in each group | 2 |
| $\overline{TO}$ | Time Out | Shut down the BY relay | 1A, 4 |
| 1M | One Minute | Strapping post for time out period | 4 |
| 2M | Two Minute | Strapping post for time out period | 4 |
| 4M | Four Minute | Strapping post for time out period | 4 |

While I have described and illustrated various specific embodiments of my invention, it will be clear that variations from the details of construction which are specifically illustrated and described may be resorted to without departing from the true spirit and scope of the invention as defined in the appended claims.

What is claimed is:

1. In a telephone switching system of the progressive type employing a plurality of selector units having electro-mechanical switching means which step in response to each dial pulse of a dialed digit, at least one additional selector unit comprising:
    switching matrix means for selectively connecting a calling station to one of a plurality of multi-wire circuits;
    electronic control means for controlling operation of said switching matrix means, said electronic control means comprising:
        means for counting dial pulses, representing a digit, received from a calling station;
        means responsive to the count of total dial pulses in said digit for actuating said matrix means to connect at least one multi-wire circuit to said additional selector for testing, if said count meets predetermined requirements; and
        means for testing the connected multi-wire circuit to determine if it is idle or busy.

2. The system according to claim 1 wherein said additional selector includes:
    scanning means for sequentially operating said matrix means to connect a plurality of said multi-wire circuits to said additional selector for testing until said means for testing finds an idle multi-wire circuit; and
    means for terminating scanning and connecting a multi-wire circuit through to the calling station when that multi-wire circuit is determined to be idle by said means for testing.

3. The system according to claims 1 or 2 wherein said matrix means comprises a plurality of selectively energizable twelve-pole relays for simultaneously connecting twelve wires to said additional selector simultaneously, said twelve wires representing three four-wire circuits or four three-wire circuits depending upon preselected system operating modes.

4. The system according to claim 3 further comprising a plurality of alternative wiring paths in said additional selector for selecting between four-wire and three-wire operating modes.

5. The system according to claim 3 wherein said means for testing comprises:
plural gated switchable means connected to at least one wire of a respective circuit connected to said additional selector for testing by said matrix means;
means for sequentially gating said switchable means;
wherein each of said switchable means switches state when gated if the voltage on its respective one wire is at a predetermined level signifying an idle circuit; and
means for disabling said scanning means when one of said switchable means switches state.

6. The system according to claim 5 further comprising connection means responsive to change of state of one of said switchable means for connecting the corresponding idle circuit through to said calling circuit.

7. The system according to claim 6 wherein said plural gated means are four in number and wherein said connection means comprises four four-pole relays, each connected to be energized in response to a change of state at a respective one of said switchable means, the poles of said relays being connected to connect the detected idle circuit through to the calling station.

8. The selector according to claim 1 further comprising seizure means for permitting seizure of said additional selector by a calling station and preventing seizure by another station alternatively in response to loop or simplex signalling.

9. In a telephone switching system, at least one selector unit having a matrix of relays for sequentially energizing one relay at a time to connect plural telephone circuits to said selector in order that the circuits may be tested for an idle condition, said selector being characterized in that said matrix includes a plurality of twelve-pole relays for simultaneously connecting twelve wires to said selector, said twelve wires corresponding to three four-wire circuits when said system operates in a four-wire mode and to four three-wire circuits when said system operates in a three-wire mode.

10. The system according to claim 9 further comprising:
four gated switchable means connected to at least one wire of a respective circuit connected to said selector by said matrix of relays;
and
means for sequentially gating said switchable means;
wherein each of said switchable means switches state when gated if the voltage level on its respective one wire is at a predetermined level signifying an idle circuit.

11. The system according to claim 10 further comprising means responsive to a change of state of one of said switchable means for connecting the corresponding idle circuit through said selector to preceding equipment.

12. In a telephone switching system of the progressive type employing a plurality of selector units having electro-mechanical switching means which step in response to each dial pulse of a dialed digit, the method of switching telephone circuits with an additional selector unit comprising the steps of:
selectively connecting a calling station to one of a plurality of multi-wire circuits through said electronic selector via a relay matrix;
electronically controlling operation of said relay matrix by the steps of:
counting dial pulses representing a digit received from a calling station;
in response to the count of total dial pulses in said digit, actuating said relay matrix to connect at least one multi-wire circuit to said electronic selector for testing if said count meets predetermined requirements; and
testing the connected multi-wire circuit to determine if it is idle or busy.

13. The method according to claim 12 further including the steps of:
sequentially scanning said relay matrix to connect a plurality of said multi-wire circuits to said additional selector for testing until said means for testing finds an idle multi-wire circuit; and
terminating scanning and connecting a multi-wire circuit through to the calling station when that multi-wire circuit is determined to be idle by said means for testing.

14. The method according to claims 12 or 13 further comprising:
simultaneously connecting twelve wires to said additional selector, said twelve wires representing three four-wire circuits or four three-wire circuits depending upon pre-selected system operating modes.

15. The method according to claim 14 wherein said step of testing comprises:
sequentially gating plural switchable means connected to respective circuits which are connected to said electronic selector by said relay matrix for test;
wherein each of said switchable means switches state when gated if its corresponding circuit is idle; and
disabling said sequential scanning when one of said switchable means switches state.

16. The method according to claim 15 further comprising connecting an idle circuit through to said calling circuit in response to a change of state at the corresponding switchable means.

17. In a telephone selector unit of the type having a matrix of relays for sequentially energizing one relay at a time to connect plural telephone circuits to said selector in order that the circuits may be tested for an idle condition, a method characterized by the step of simultaneously connecting twelve wires to said selector, said twelve wires corresponding to three four-wire circuits when said system operates in a four-wire mode and to four three-wire circuits when said system operates in a three-wire mode.

* * * * *